Aug. 19, 1969

J. W. HEALY ET AL 3,461,757

SHEET HANDLING APPARATUS AND METHOD

Filed July 25, 1966

JAMES W. HEALY
WILLIAM P. HIDDEN
DONALD C. ANDERSON
INVENTORS.

BY Townsend and Townsend

JAMES W. HEALY
WILLIAM P. HIDDEN
DONALD C. ANDERSON
INVENTORS.

BY

Aug. 19, 1969   J. W. HEALY ET AL   3,461,757
SHEET HANDLING APPARATUS AND METHOD
Filed July 25, 1966   6 Sheets-Sheet 3

JAMES W. HEALY
WILLIAM P. HIDDEN
DONALD C. ANDERSON
INVENTORS.

BY
Townsend and Townsend

JAMES W. HEALY
WILLIAM P. HIDDEN
DONALD C. ANDERSON
INVENTOR.

BY

Townsend and Townsend

United States Patent Office 3,461,757
Patented Aug. 19, 1969

3,461,757
SHEET HANDLING APPARATUS AND METHOD
James W. Healy, Waltham, and William P. Hidden, Cambridge, Mass., and Donald C. Anderson, Lafayette, Calif., assignors, by direct and mesne assignments, to Hexcel Corporation, Berkeley, Calif., a corporation of California
Filed July 25, 1966, Ser. No. 567,452
Int. Cl. B26d 7/00, 7/06, 5/20
U.S. Cl. 83—23                                    14 Claims

ABSTRACT OF THE DISCLOSURE

Sheet handling apparatus and method suitable for use in making honeycomb structures wherein a sheet is moved along a predetermined path, cut into predetermined lengths, and stacked below the cutting zone. The sheet is held as it is being cut and adjustments in the position of the sheet relative to the stack can be made by sensing the leading edge of the sheet. The stack is movable upwardly to receive the cut sheet and the movement is responsive to the height of the stack.

---

This invention relates to improvements in sheet handling techniques and, more particularly, to apparatus and a method for handling sheet material which may be used in making honeycomb structures.

The present invention is directed to improved apparatus and a method for handling sheet material wherein such material is successively fed from a supply, is measured and precisely cut at its successive end portions and is stacked in a disposition for subsequent use. Each end portion of the sheet material that is cut is relatively long and the cut portions are accurately stacked in a predetermined manner. Thus, the invention is especially adapted for, but not limited to, the use in forming honeycomb structure wherein the sheet material has spaced, transverse glue lines applied thereto. When the cut portions of the material are stacked, the glue lines of adjacent portions are staggered with respect to each other causing adjacent sheets of the stack to adhere together at the glue lines. By employing an expansion process, the stack can be made to expand to form a honeycomb configuration.

As each end portion of the sheet material moves into place prior to its being cut, its leading edge is photoelectrically sensed at a first location spaced from the cutting zone. The sheet material is then stopped and the end portion is moved very slowly until its trailing extremity is at the proper location for cutting. This proper location is also established by again photoelectrically sensing the leading edge of the sheet portion to be cut. This slow or creeping movement of the sheet portion is effected by the use of a pair of vacuum belts mounted on a first frame, the latter, in turn, being coupled by flexure plates to a second, outer frame. A screw drive moves the first frame relative to the second frame since the flexure plates permit such movement due to their resilience. The vacuum belts are spaced apart so that the photoelectric sensing means can be placed therebetween and thereby more effectively sense the leading edge of the sheet. This sensing means is adjustable in position to allow for variations in the lengths of the sheets to be cut.

A stacking table capable of being raised and lowered is disposed beneath the vacuum belts and supports the stack of sheets cut to a desired length. The table has a mechanism for sensing the height of the stack and for changing the lowermost position of the table so that this position will be progressively lowered to compensate for the progressive increase in the height of the stack.

In producing honeycomb by the expansion process, a continuous web of a sheet material is fed from an adhesive application station at which the glue lines are applied to both sides of the web and extend in the direction of the web movement. Following this operation, the web is cut into sheets and the sheets are stacked, alternate sheets being inverted so that the glue lines on juxtanate faces of adjacent sheets will be matched. It is extremely important that the glue lines be properly aligned with respect to each other in order that the honeycomb structure made from the stack of sheets be properly formed.

Under the present method of manufacture of honeycomb structures, the L dimension of each structure is transverse to the longitudinally extending glue lines on the sheet of material which is successively cut to form the stack of sheets. Since conventional sheet handling equipment is such as to limit the effective width of the sheet material that can be handled, it follows that the honeycomb structure made in this manner will be limited in its L dimension to a predetermined value. For many applications it is desirable that this L dimension be greater than that which is now obtainable. Also, it is oftentimes necessary to cut a stack of sheets prior to expansion thereof into a honeycomb configuration in order to meet a particular order. The unused portion of the stack is then returned to inventory and may or may not be used depending upon the demands which subsequently arise. Because it may have been made to an unusual cell size and foil gauge specification, the "remnant" may remain unused for a long period of time. Therefore, loss of profits will be sustained if the remaining portion of the honeycomb structure is not utilized.

The present invention permits the formation of a honeycomb structure having an L dimension which is much greater than that presently attainable. Moreover, the specific honeycomb structure can be made to satisfy substantially any size requirements in a manner which will avoid material waste. Thus, substantial economies can be practiced with the invention while, at the same time, the range of sizes of the honeycomb structures formed in accordance therewith can be significantly broadened. The advantages of the invention are obtainable through the use of the cross-line application of the glue lines with respect to the direction of foil or web movement of the sheet material. The accuracy in glue line registration between adjacent sheets is attained in the present invention by precisely positioning the web with respect to a cutter severing the web as it is fixedly held and stacking the cut sheets with the glue lines of juxtaposed sheet faces in contact with each other.

It is therefore the primary object of this invention to provide an improved apparatus and method for handling sheet material wherein the material is removed from a supply, measured and precisely cut prior to being stacked in a position permitting the sheets of cut material to be subsequently used in a particular manner such as for use in forming honeycomb structures.

Another object of this invention is to provide apparatus and a method of the type described wherein the leading edge of the sheet material is sensed as the material moves over a predetermined path so that the individual sheets to be cut from the material are accurately positioned for cutting without having to rely on sheet-engaging guides or similar structure or on reference indicia on either face of each sheet itself.

A further object of the invention is to provide sheet positioning means including a pair of relatively shiftable, interconnected mounting frames whereby the sheet material can be moved at a relatively high speed over one portion of its path of travel and then moved at a relatively low speed over the final portion of the path to assure that not only will the sheet be accurately positioned for cutting but also the sheet handling process will be accelerated without sacrificing the desired accuracy.

Another object of this invention is to provide a sheet handling apparatus and method wherein a stack of individual sheets having glue lines thereon may be formed with the glue lines being traneverse to the direction of movement of the sheet material so that the glue lines of adjacent sheets will be properly aligned with each other and, upon expansion, the stack will form a structure having honeycomb configuration.

A further object of the invention is the provision of apparatus of the type described having a shiftable stacking table movable into and out of a position adjacent to the web path wherein the table has a sensing mechanism for progressively determining the height of the stack carried thereby so that the sheets will be properly positioned in the stack with the glue lines of one sheet in accurate alignment with the corresponding glue lines of an adjacent sheet.

In the drawings:

FIG. 6b is a bottom plan view looking in the direction of line 6b—6b of FIG. 6a;

Figure 1:
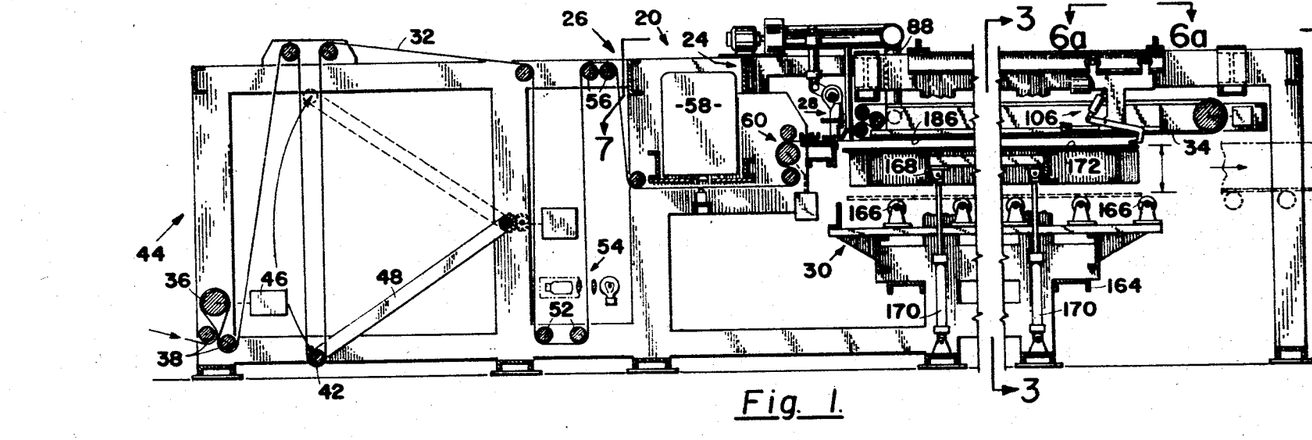
FIG. 1 is a side elevational view of the sheet handling apparatus showing the stacking table in an elevated position.

A preferred form of the apparatus of this invention is denoted by the numeral 20 and is illustrated in FIG. 1. Apparatus 20 inculdes a web tensioning mechanism 22 at the web input end thereof, a pair of inner and outer frames 24 and 26 adjacent to the opposite end of the apparatus, a web cutting assembly 28 adjacent to frames 24 and 26, and a stacking table 30 also adjacent to frames 24 and 26 for stacking individual sheets after the same have been cut by assembly 28.

Figure 2:
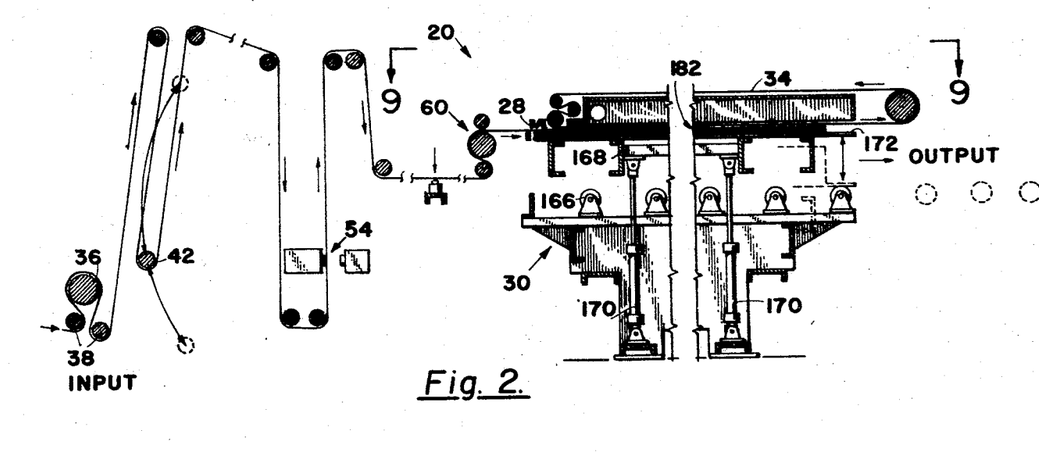
FIG. 2 is a schematic view of the apparatus of FIG. 1.

A web 32 of flexible, severable material is drawn from a supply, such as a roll of the material and is moved into coupled relationship with mechanism 22 prior to being moved into an operative position with a web holding and aligning means 34 carried by inner frame 24. Web 32 may be of any suitable material, such as aluminum foil or the like. As shown in FIGS. 1 and 2, the foil is driven through the apparatus by a drive roll 36 past a first pair of idler rollers 38, a second pair of idler rollers 40 and a dancer roll 42 forming a part of mechanism 22 in a manner to be described. Rollers 38 and 40 are carried on a frame-like structure 44 which defines the overall support for the components of the apparatus. Rollers 38 and 40 are horizontally disposed and cooperate with mechanism 22 to provide tension in web 32. A drive motor 46 is coupled with drive roll 36 to move the web in a direction toward cutter 28.

Figure 4:
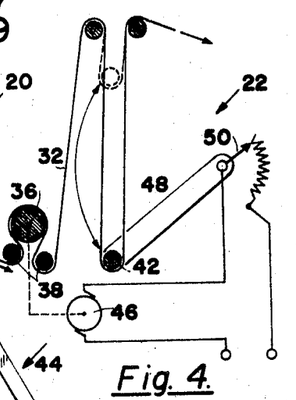
FIG. 4 is a schematic view of the web tensioning mechanism of the apparatus.

Mechanism 22 is shown in detail in FIG. 4 wherein roll 42 is carried by a swingable arm 48 movable in a vertical plane between the full line position and the dashed line position of FIG. 4 in response to increases in the tension of the web during movement thereof along its predetermined path of travel. Arm 48 is coupled to one terminal of a rheostat 50 coupled in a circuit having a relay 52 for controlling the actuation of motor 46. Thus, the speed of movement of web 32 can be increased or decreased as is necessary. As arm 48 swings upwardly, the web will be increased in speed to satisfy the demand therefor.

Web 32 moves past a pair of spaced, horizontal edge guide steering rolls 52 and then past an edge guide sensor 54. The web then passes over idler rolls 56, then downwardly and beneath an optical comparator 58, then through a nip roll assembly 60 and finally adjacent to cutting assembly 28 and holding means 34. Comparator 58 permits viewing of the glue lines with respect to a predetermined reference mark forming a part of the comparator and the web drive system allows the web to be shifted slightly in either direction. In this way, adjustments can be made in the position of the end portion of the web prior to its being severed from the remainder of the web to assure that the glue lines on the severed end portion are correctly positioned relative to the glue lines of a previously severed end portion.

Figure 3:
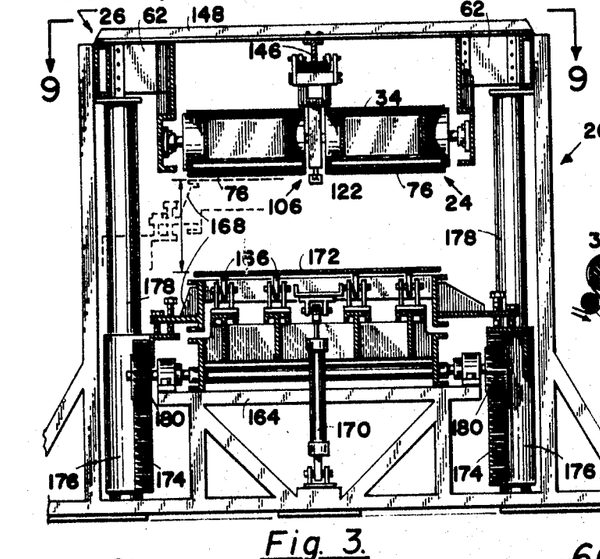
FIG. 3 is a cross sectional view taken along line 3—3 of FIG. 1.
Figure 7:
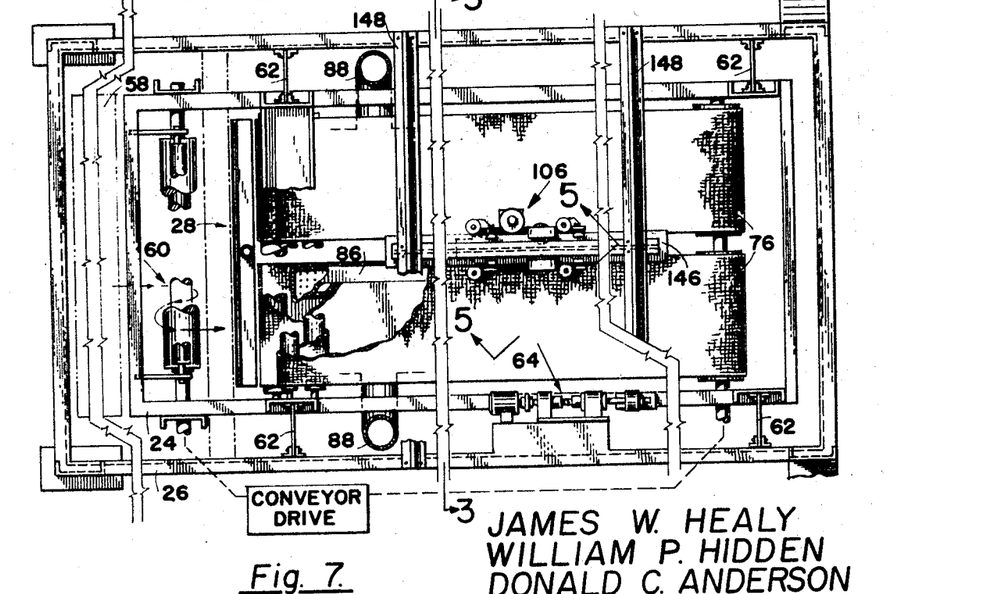
FIG. 7 is a top plan view of the inner and outer frames and the vacuum belts on the inner frame for positioning the web of sheet material before cutting.
Figure 9:
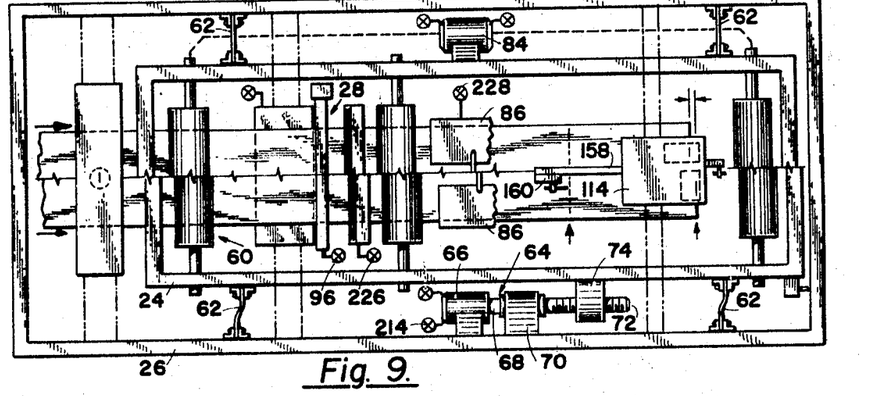
FIG. 9 is a schematic, top plan view of the frames and web, illustrating the way in which the inner frame is disposed relative to the outer frame to position the web.

FIGS. 7 and 9 illustrate the construction of frames 24 and 26 and show that the same are interconnected by a number of flexure plates 62 extending between the outer periphery of inner frame 24 and the inner periphery of outer frame 26. Frames 24 and 26 are rectangular and, as shown in FIG. 3, the plane of frame 24 is below the plane of frame 26 with the frame being substantially coplanar with each other. Plates 62 allow frame 24 to be shifted with respect to frame 26 for a purpose to be described. Creep drive structure 64 carried by frame 26 is coupled to frame 24 to effect the relative movement thereof. FIG. 9 shows plates 62 in their flexed and unflexed positions. When the plates are flexed, frame 24 is in a position slightly displaced from its position when the plates are unflexed.

Creep drive structure 64 includes a reversible drive motor 66 having an output shaft 68 coupled with a clutch-brake 70, the latter, in turn, being coupled to a rotatable screw 72 extending longitudinally of the frames. Screw 72 is threadably received within a coupling member 74 rigidly secured at one side of frame 24.

Figure 8:
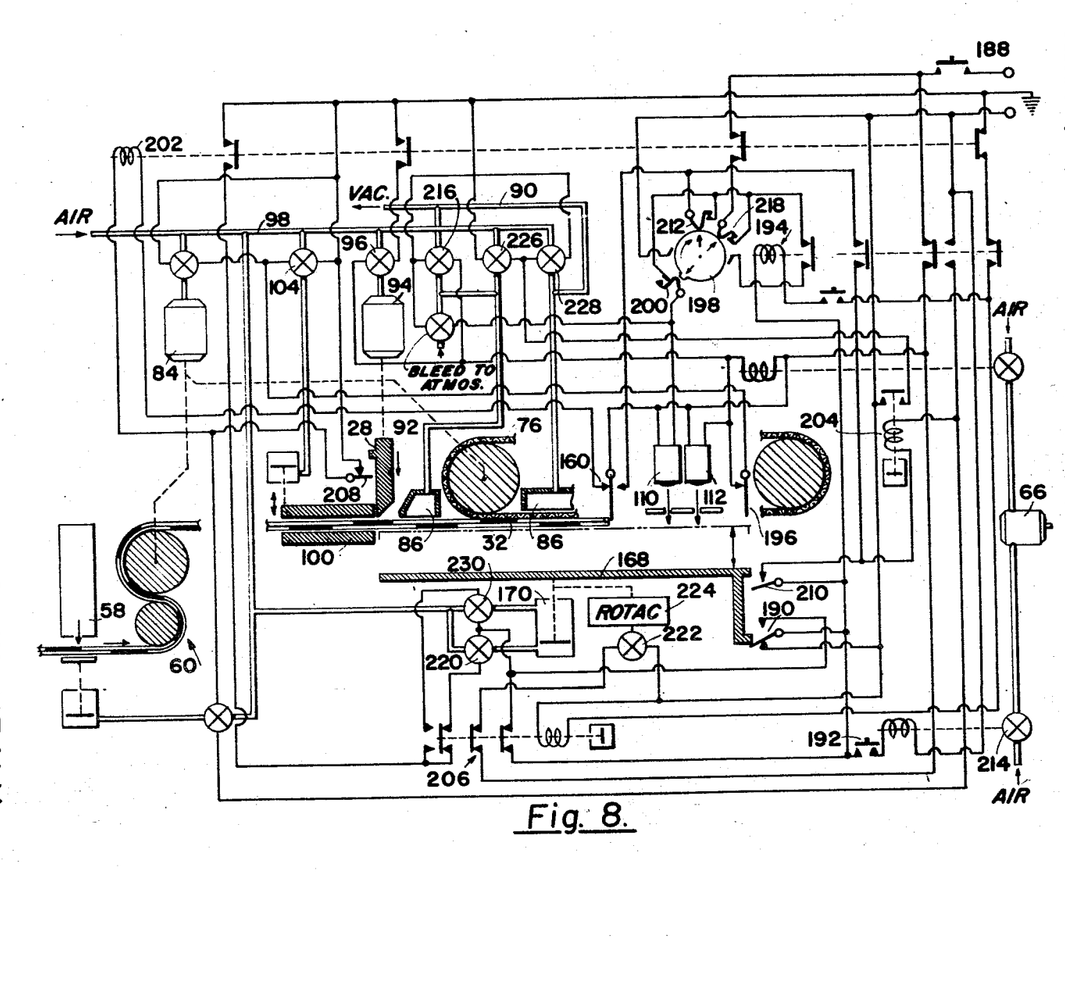
FIG. 8 is a schematic view of the electrical and hydraulic connections for operating the apparatus.

Web holding and aligning means 34 includes a pair of endless, flexible, porous vacuum belts 76 (FIGS. 2 and 7) disposed on roller means 78 at the upstream end of frame 24 and on roller means 80 on the downstream end thereof. Each belt 76 has a horizontal, lowermost stretch 82 which is directly adjacent to the horizontal path of web 32 as the same moves away from nip roll assembly 60. As shown in FIG. 9, roller means 78 and roller means 80 are journaled in the sides of frame 24. Moreover, a drive motor 84 is coupled with roller means 80 and nip roll assembly 60 for simultaneously driving the same at a predetermined speed. As shown in FIG. 8, plenum chamber structures 86 are disposed directly above the lowermost stretch 82 of each belt 76 and are coupled by conduits 88 to a source of vacuum (not shown) coupled to conduit 90. Conduits 88 are shown in FIG. 7 and extend laterally from belts 76 and thereby externally of frame 24 for connection to the vacuum source. Stretches 82 of belts 76 operate to grip the upper surface of web 32 and thereby hold the web in an operative position prior to its being cut by cutting assembly 28.

Assembly 28 includes a cutting blade 92 above the path of web 32 and coupled to a shear motor 94 operated through a valve 96 coupled to an air pressure source connected to conduit 98. A web guide lock 100 operated by a piston and cylinder assembly 102 holds web 32 as it is being cut by blade 92. Air under pressure is supplied to assembly 102 through valve 104.

Figure 5:
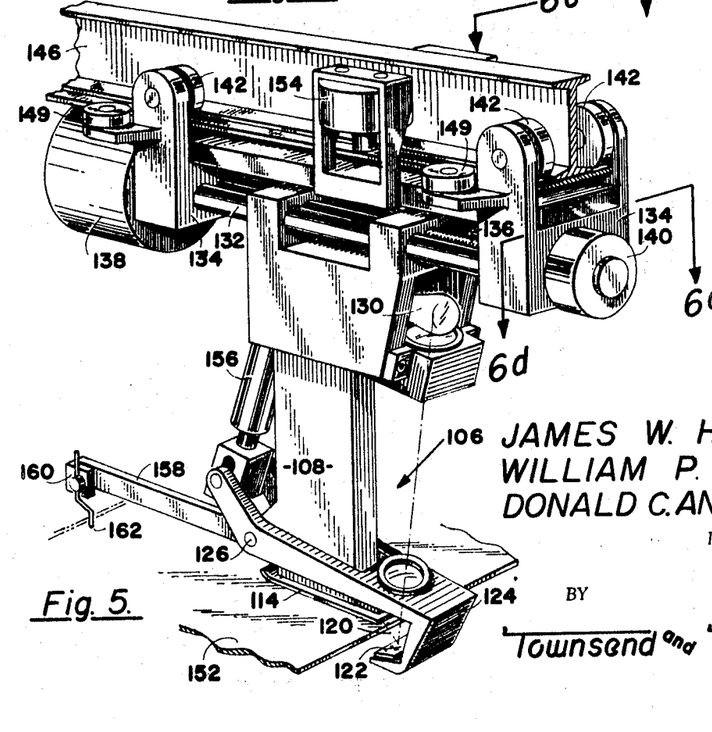
FIG. 5 is an enlarged, perspective view of the photoelectric sensing means for sensing the leading edge of the web.

Means for sensing the leading edge of web 32 as it travels beneath belts 76 includes a support 106 (FIGS. 5 and 6) including a housing 108 having a pair of photoelectric sensors 110 and 112 (FIG. 8) therein. Housing 108 is closed at the bottom by a plate 114 having a pair of apertures 116 and 118 therethrough, aperture 116 being aligned with sensor 110 and aperture 118 being aligned with sensor 112 with respect to an optical axis 120 extending between a mirror 122 and plate 114. Mirror 122 is carried on a J-shaped arm 124 pivotally mounted by a pin 126 to housing 108 (FIG. 5). Arm 124 has an aperture 128 therethrough for passing a light beam to mirror 122 from a light source 130 carried by support 106 above arm 124.

Support 106 is movably carried on a number of spaced rods 132 extending between a pair of spaced mounting brackets 134. A screw 136 coupled with structure 106 shifts the same along rods 132 in response to the actuation of a motor 138 coupled to screw 136. A brake 140 is also coupled with screw 136 and stops the rotation thereof after motor 138 has been energized. Thus, small changes can be made in the position of structure 106 relative to brackets 134.

Each bracket 134 has a pair of spaced rollers 142 which are supported on a plate 144 secured to the underside of an I-beam 146 extending longitudinally of the web path and secured to structure 44 by cross beams 148 (FIGS. 3 and 7). Each bracket further has a pair of horizontally disposed guide rollers 149 which engage the longitudinal edges of plate 144. A reversible motor 150 coupled to brackets 134 engages beam 146 in a manner to cause shifting of the brackets relative to the beam when the motor is actuated. Thus, changes in the position of brackets 134 can be attained. This allows sheets of different lengths to be cut from the web inasmuch as the photoelectric sensors 110 and 112 carried by structure 106 are operable to sense the leading edge 152 of web 32 to stop the movement of the latter. A pair of fluid piston and cylinder assemblies 154 coupled to brackets 134 are disposed to engage plate 144 and thereby releasably grip the latter. This structure thus forms a lock to hold structure 106 in a fixed position relative to beam 146. A piston and cylinder assembly 156 is carried by support 106 and is coupled to arm 124 to swing the latter outwardly into the dashed line position of FIG. 6a when table 30 is elevated to an operative position for stacking of the sheets carried on stretches 82 of belts 76. An arm 158 extends laterally from housing 108 (FIG. 5) in a direction upstream of the web path and is provided with an electrical switch 160 having a shiftable arm 162 normally positioned across the path and engaged by leading edge 152 for a purpose to be described.

Table 30 includes a fixed base 164 having a number of spaced rollers 166 on the upper extremity thereof and a vertically reciprocal platform 168 disposed for movement into and out of the dashed line position of FIG. 3. A number of piston and cylinder assemblies 170 interconnect base 164 and platform 168 to raise and lower the latter. Caul plate 172 is removably carried on platform 168 and engages rollers 166 when the platform is in its lowered position. The sheets cut from the web are stacked on the caul plate and the latter is shifted laterally of table 30 over rollers 166 when the stack of sheets is to be removed as shown in FIGS. 1 and 2 in dashed lines.

To keep platform 168 substantially level at all times, it is provided with a number of racks 174 carried by tubes 176 surrounding upright, cylindrical members 178 rigidly secured to structure 44. Base 164 has pinions 180 for engaging respective racks 174 to assure uniform movement of platform 168 at all locations thereon.

Figures 10A, 10B, 10C, 10D:
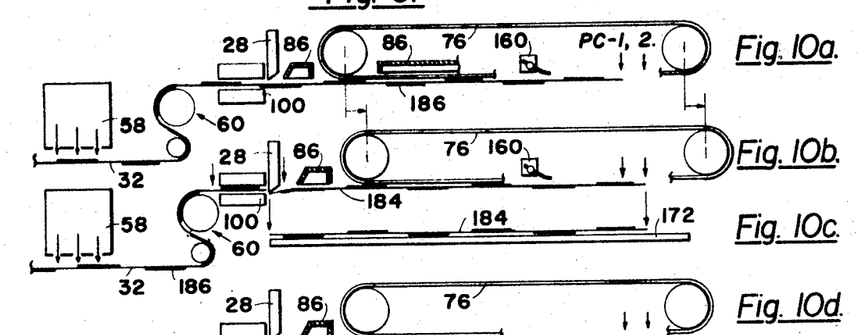
FIG. 10a is a schematic representation of the vacuum belts and the web as the web moves into an operative position beneath the belts.
FIG. 10b is a view similar to FIG. 10a but showing the way in which the web is severed.
FIG. 10c is a schematic view showing the severed sheet portion on the stacking table.
FIGS. 10d, 10e and 10f show the sequence of positioning the web befor it is cut, the disposition of the web after it has been cut, and the stacking of the sheets on the stacking table.
Figures 10E, 10F, 11A:
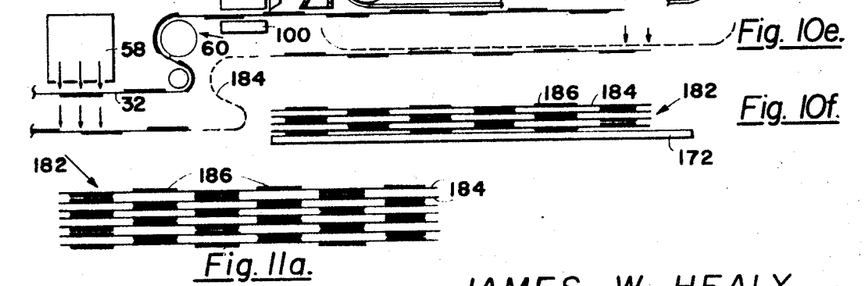
FIG. 11a is a side elevational view of the sheet stack with the glue lines on the sheets in proper alignment relative to each other.
Figure 11B:
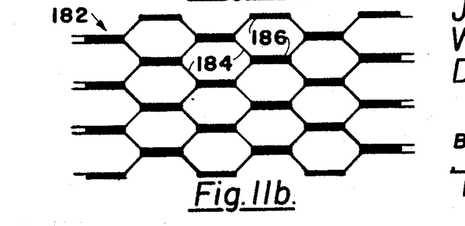
FIG. 11b is a view similar to FIG. 11a but showing the stack in an expanded condition to form a honeycomb structure.
Figure 12:
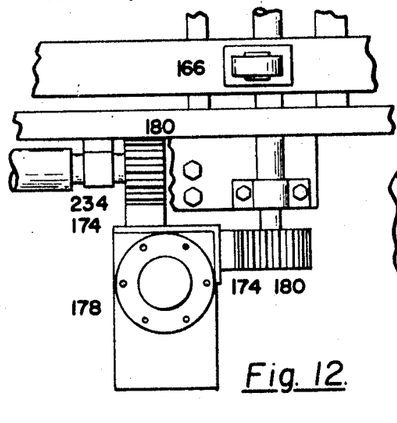
FIG. 12 is a fragmentary, top plan view of the stacking table.
Figure 13:
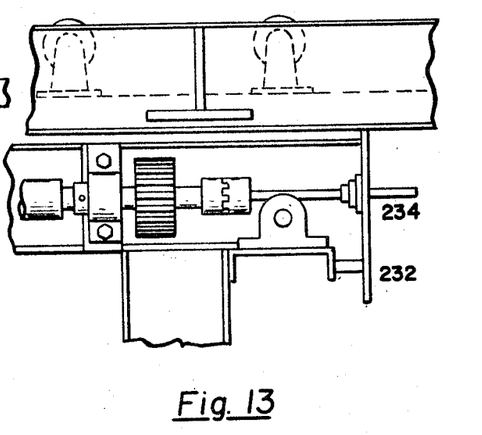
FIG. 13 is a fragmentary, side elevational view of the table.

The apparatus of this invention is especially adapted to form a stack 182 of sheets 184 in the manner shown in FIG. 11a, each sheet having spaced glue lines 186 on its upper and lower surface. The glue lines on the lower surface are staggered with respect to the glue lines on the upper surface so that, when the stack is expanded, it assumes a honeycomb configuration in the manner shown in FIG. 11b. Web 32 is initially moved past a glue line applicator wherein the glue lines are applied to the surface of the web transversely of its path of movement. Since the L direction of a honeycomb structure is transverse to its glue lines, it is clear that the apparatus of this invention is capable of forming a honeycomb structure having an L direction significantly greater than that attainable with conventional equipment.

The apparatus is operated by applying the glue lines to the web and then moving the web along a path of travel as shown in FIG. 2. Drive roll 36 moves the web forwardly and the proper tension is maintained on the web by the apparatus as shown in FIGS. 1 and 2.

The web then moves past the comparator by means of which the glue lines on the web are oriented relative to a reference index of the conveyor assembly. The web then moves into coupled relationship with nip roll assembly 60 and then beneath belts 76 in the manner shown in FIG. 10a.

The initial movement of web 32 is quite fast and the speed is reduced when leading edge 152 of web 32 engages arm 162 of switch 160 (FIG. 5). The reduction in speed is accomplished in any suitable manner, such as by reducing the voltage applied to drive motor 46.

As the end portion of web 32 moves away from nip roll 60, it passes through lock 100 and beneath stretches 82 of belts 76. Some means may be provided to prevent the sag of the web as it moves toward belts 76 from nip roll assembly 60. To this end, a vacuum chamber can be placed directly above the path of the web immediately upstream of belts 76 to force the web upwardly until it engages stretches 82. A suitable support from beneath the path can also be used if desired.

Belts 76 draw web 32 against stretches 82 by suction. The web is then retained on the underside of the belts until the vacuum is removed.

The initial movement of the web is at relatively high speed and, when leading edge 152 engages arm 162 of switch 160 (FIG. 5), the speed is reduced. The web then moves at the reduced speed until leading edge 152 interrupts the light beam entering aperture 116. Sensor 110 then causes motors 46 and 84 to stop while, at the same time, motor 66 is energized to rotate screw 72 and shift frame 24 relative to frame 26 downstream of the web path. Plates 62 are then caused to flex and this movement continues until leading edge 152 interrupts the light beam entering aperture 118. Sensor 112 thus causes motor 66 to be de-energized. When this occurs, the web is ready to be cut and blade 92 is forced downwardly in the manner shown in FIG. 10b to cut the web and form a sheet 184. Lock 100, prior to the downward movement of blade 92, will grip the web and hold the same while it is being cut. In FIG. 10e, the severed sheet is shown resting on caul plate 172.

In FIGS. 10d, 10e and 10f, the web is shown as being moved into a position for cutting, the only difference between these views and those of FIGS. 10a, 10b and 10c being that one set of views shows one sheet 184 being cut from the web while the other set of web shows the adjacent sheet being cut from the web with the glue lines on the upper face of the one sheet being in vertical alignment with the glue lines on the lower face of the sheet next adjacent and above. FIG. 10f shows the stack of sheets on caul plate 172.

The operation of the various components of the apparatus can be described with reference to FIG. 8 wherein a normal operating cycle in the automatic mode will be detailed. The following description will also apply to a normal cycle in the manual mode with the exception that the apparatus will cease operation at the completion of each functional step and will await instruction to proceed thereafter.

A normal cycle in the automatic mode can be initiated in one of two ways. If stopped, a normal cycle can be started by pressing switch 188. If it is already in operation, a new cycle will be initiated upon the actuation of switch 190 when platform 168 is lowered.

Two independent functions normally occur at the start of a cycle. These are the feeding of the web along its path of movement and the return to an initial position of the screw 72 forming a part of creep drive structure 64. The reverse creep operation is controlled by limit switch 192 in combination with a cycle toggle 194, the latter having been latched and limit switch 160 being open. The feeding of web 32 is started by toggle 194 having been latched in combination with sensor 110 still receiving light and limit switch 196 open, limit switch 196 being provided to sense overtravel of the web. If these conditions exist, nip roll assembly 60 is actuated and lock 100 is opened by energizing valve 104. At the same time, a control Slo-Syn motor 198 is energized through toggle 194, sensor 110 and limit switch 200. Motor 198 is caused to rotate through 180° at which point cam operated switch 200 opens to stop the motor. The purpose of the control motor 198 is to accelerate belts 76 to a first, relatively high speed. In addition to this, the multi-circuit toggle 202 is latched by way of toggle 194 and switch 160. Toggle 202 serves a number of purposes. At the start of each new cycle, the coil of time delay relay 204 is deenergized and the delay relay 206 is instantaneously reset by way of toggle 194.

The stages of the various components following the start of a normal cycle is as follows:

(1) Reverse creep operation being performed if necessary and until limit switch 192 is closed.
(2) Motor 198 rotating through the first 180° accelerating belts 76 to a relatively high speed.
(3) Nip roll assembly 60 and belts 76 in operation.
(4) Lock 100 being open and valve 104 being energized.
(5) Relay 206 energized and relay 204 deenergized.
(6) Switch 160 open and light beams directed to sensors 110 and 112.
(7) Limit switch 208 and limit switch 210 being open while limit switch 110 is closed.

Nip roll assembly 60 and belts 76 will be actuated to carry the web at maximum speed until leading edge 152 of the web actuates switch 160. This closes the switch and reenergizes motor 198 through a cam operated switch 212 for an additional 140° of rotation. The second segment of rotation controls the deceleration of belts 76 to a relatively low coasting speed. Belts 76 carry the web at the lowered speed until leading edge 152 intersects the light beam to sensor 110. At this point, belts 76 and nip roll 60 are stopped and creep drive structure 64 is actuated by energizing solenoid 214.

Frame 24 is then moved at a very low rate relative to frame 26 until leading edge 152 interrupts the light beam to sensor 112. When this occurs, valve 216 is energized to apply high vacuum to chamber 86 and motor 94 is actuated by energizing valve 96 to initiate the shearing action of blade 92. At the bottom of the shear stroke, switch 208 is closed to, in turn, cause the relays of toggle 202 to deenergize valve 96. This action energizes motor 198 through a third cam operated switch 218 and initiates the rise of platform 168 to collect the sheared sheet. Valve 220 is opened to actuate assemblies 170 for this purpose. Motor 198 rotates through its final 40° to return to its starting position.

Platform 168 continues to rise until limit switch 210 is actuated. This action releases toggle 194 and deenergizes the coil of relay 206 while energizing the coil of relay 204. This action also energizes solenoid 222 to adjust the platform lowered position by means of a Rotac mechanism 224. The energizing of relay 204 resets its contacts which causes valves 226 and 228 to purge chambers 86 of vacuum and to pressurize the same.

After a preset time during which platform 168 has been pressed up against a sheet carried by belts 76, relay 206 opens to initiate the lowering of the platform by deenergizing valve 220 and energizing valve 230. At the same time, solenoid 222 is deenergized but valves 226 and 228 remain energized. When platform 168 has been lowered to a sufficient distance to deactuate switch 210, the coil of relay 204 is deenergized to initiate the preset delay interval of relay 204. When the interval has expired, valves 226 and 228 are deenergized to re-establish the vacuum in chambers 86. Platform 168 is lowered until switch 190 is actuated.

In addition to stopping the platform lowering operation the closing of switch 190 initiates the beginning of a new cycle.

Figure 6A:
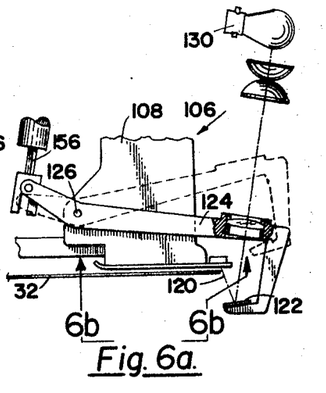
FIG. 6a is a fragmentary side elevational view of the sensing means.
Figure 6B:
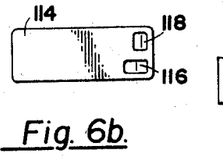
Figure 6C:
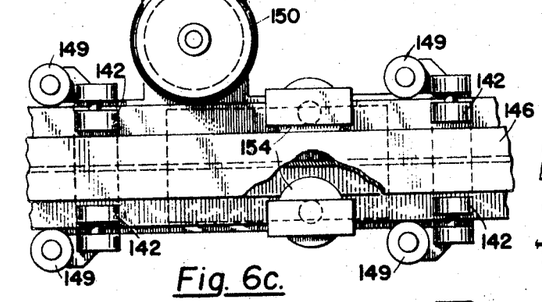
FIG. 6c is a fragmentary, top plan view looking in the direction of line 6c—6c of FIG. 5.
Figure 6D:
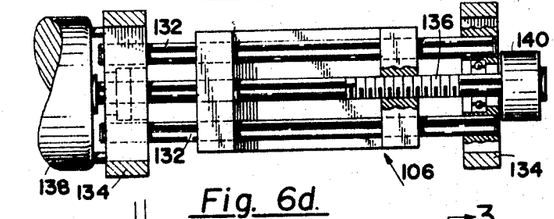
FIG. 6d is a cross sectional view taken along line 6d—6d of FIG. 5.

Mirror 122 on arm 124 is in the operating position of FIG. 6a throughout a normal cycle although it is retracted by actuating assembly 156 is raised. Certain interlocks may be provided to interrupt the normal cycle in the event of a failure in certain critical components. For example, switch 196 has been provided to sense the passage of leading edge 152 beyond sensor 112. Another example of an interlock is the provision of structure to prevent the start of a false cycle in the event of either a failure of sensors 110 and 112 or any other failure equivalent to darkened sensors. In this case, no action will be initiated except for a reverse creep cycle if such is necessary. Motor 84 will not be energized to accelerate belts 76, blade 92 will be operated, and the forward creep cycle of frame 24 will not be initiated. Such failure will immediately be apparent to the operator of apparatus 20 who can then take corrective action.

Figure 14:
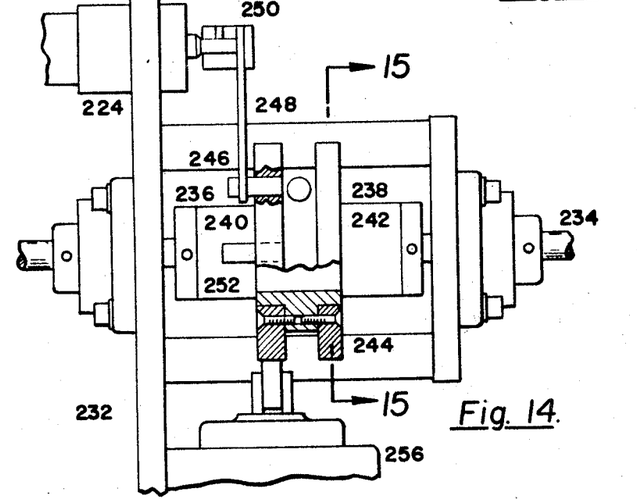
FIG. 14 is an enlarged, side elevational view of the reset cam mechanism of the table.
Figure 15:
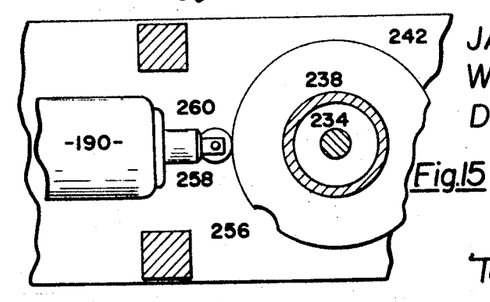
FIG. 15 is a cross sectional view taken along line 15—15 of FIG. 14.

The means for progressively changing the lowermost position of the stack is illustrated in FIGS. 14 and 15. The purpose of this means is to accommodate the progressive increase in the height of stack 162 on caul plate 172 during the cutting and stacking operation. As the stack is raised it "bottoms out" on a sheet 184 held by belts 76. This stops the upward movement of the stack and simultaneously actuates switch 210.

It is necessary for the stack to be lowered to a new lowermost position so that web 32 may pass into a position beneath belts 76 to initiate the formation of a new sheet. To this end, Rotac mechanism 224 is secured to a mounting plate 232 on base 164. A rotatable shaft 234 forming a part of the rack and pinion structure of table 30 passes through plate 232 and a pair of clutches 236 and 238 are mounted on the shaft. These clutches are of the overrunning type and have cams 240 and 242 respectively coupled thereto. The cams are joined by a hub 244 and a pin 246 projects laterally from cam 240. An arm 248 extending laterally from the shaft 250 of Rotac mechanism is engageable with pin 246 to rotate the latter and thereby cams 240 and 242 relative to shaft 234 when mechanism 224 is actuated. A pin 252 is engageable with a stop (not shown) on plate 232 for limiting the rotation of the cams to a predetermined arc.

A deceleration valve 254 is coupled in the fluid flow line of assemblies 170 and is actuated by cam 240 to decelerate the upward movement of platform 166 after it has been moved through a predetermined distance corresponding to a preselected arc through which cam 240 moves. This action prevents the stack from being forceably jammed against the sheet held by belts 76.

Cam 242 is coupled with switch 190 in the manner shown in FIG. 15, cam 240 having an indentation 256 which receives a roller 258 on the shiftable arm 260 of switch 190. When the roller is received within the indentation, switch 190 is actuated. The resetting of cam 242 changes the arcuate position of indentation 256 with respect to the roller so that the platform is stopped at a different position each time it is lowered.

While the present invention has been described with respect to the formation of a stack of sheets having transverse glue lines thereon, it is clear that the apparatus and method of the invention can be utilized in other sheet handling applications and the foregoing description should not be considered to limit the scope of the invention.

What is claimed is:

1. Sheet handling apparatus comprising: means adapted to be coupled with a length of sheet material for moving the same along a predetermined path; means responsive to the position of the leading edge of said length and coupled with said moving means for stopping the movement of said length; means adjacent to said path for severing said length after it has been stopped to define a sheet having a predetermined length; means adjacent to said severing means for releasably holding said length as it is being severed; and means below said severing means and said holding means for receiving and retaining said sheet after it has been released from said holding means.

2. Sheet handling apparatus comprising: a supply of sheet material; means coupled with said sheet material for feeding the same from said supply along a predetermined path; means responsive to the position of the leading edge of said sheet material and coupled with said moving means for stopping and starting the movement of said sheet material; means adjacent to said path for severing the sheet material after it has been stopped to define a sheet having a predetermined length; means adjacent to said severing means for releasably holding the upper surface of the sheet material as the latter is being severed; means below said holding means for receiving and retaining the severed sheet in a stack; and means coupled with said stopping and starting means for controlling the same to permit a number of sheets to be successively cut by said severing means and to be stacked by said receiving and retaining means.

3. Sheet handling apparatus comprising: a supply of sheet material; an actuatable cutter assembly spaced from said supply and adapted to sever the end portion of the sheet material to form therefrom a sheet having a predetermined length; means coupled with said sheet material for intermittently moving the same along a predetermined path past said cutter assembly, whereby successive end portions of the sheet material are severed when said cutter assembly is successively actuated to form a plurality of said sheets; means coupled with said moving means and responsive to the position of the leading edge of each of said end portions for stopping the movement of said sheet material with the trailing extremity of the end portion adjacent to said cutter assembly; means adjacent to said cutter assembly for holding each end portion and for shifting the same in a direction to align the trailing extremity thereof with said cutter assembly; and vertically shiftable means below said holding and shifting means for receiving and stacking said sheets.

4. Apparatus as set forth in claim 3, wherein said moving means includes a drive roll engageable with said sheet material adjacent to said supply and a conveyor assembly engageable with the sheet material adjacent to said end portion, whereby the sheet mterial is driven at a pair of spaced locations thereon, said conveyor assembly forming a part of said holding and shifting means.

5. Apparatus as set forth in claim 3, wherein said shifting means includes a frame, means carried by the frame and engageable with the upper surface of the sheet material for releasably retaining said sheet material on the frame, means mounting said frame for reciprocation through a limited distance along said path, and means coupled with the frame for reciprocating of the same through said distance.

6. Apparatus as set forth in claim 3, wherein said shifting means includes a movable frame, means coupled with the frame for moving the same, and a pair of spaced vacuum belts movably mounted on said frame, said belts being cooperable with said moving means to move said sheet material along said path and being cooperable with said frame to releasably retain the end portion of the sheet material thereon after the movement of the sheet material has been stopped, said stopping means including a first photoelectric sensor carried by said frame between said belts and disposed for sensing the leading edge of each of said end portions, there being a second photoelectric sensor carried by said frame between said belts and disposed for sensing the leading edge of each end portion as the latter is shifted under the influence of said frame, said second sensor being coupled with said frame moving means for stopping the movement of the frame when the leading edge of each end portion is sensed.

7. Apparatus as set forth in claim 3, wherein said shifting means includes a movable frame, said stopping means including a photoelectric sensor mounted on said frame for movement along said frame longitudianally of said path, and means releasably securing the sensor to the frame at any one of a number of operative positions thereon.

8. Sheet handling apparatus comprising: a supply of sheet material; an actuatable cutter assembly spaced from said supply and adapted to sever the end portion of the sheet material to form therefrom a sheet having a predetermined length; means coupled with said sheet material for intermittently moving the same past said cutter assembly, whereby successive end portions of the sheet material are severed when said cutter assembly is successively actuated to form a plurality of said sheets; means coupled with said moving means and responsive to the position of the leading edge of each of said end portions for stopping the movement of said sheet material with the trailing extremity of the end portion adjacent to said cutter assembly; a first frame; a second frame adjacent to said first frame; a number of flexure plates interconnecting said frames; means on one of the frames for releasably retaining the end portion of the sheet material thereon; and screw means coupled to the frames for shifting said one frame relative to the other frame, whereby the end portion carried by said retaining means may be moved to position its trailing extremity in alignment with said cutter assembly; and means adjacent to said aligning means for receiving and stacking said sheets.

9. Sheet handling apparatus comprising: a supply of sheet material; an actuatable cutter assembly spaced from said supply and adapted to sever the end portion of the sheet material to form therefrom a sheet having a predetermined length; means coupled with said sheet material for intermittently moving the same past said cutter assembly, whereby successive end portions of the sheet material are severed when said cutter assembly is successively actuated to form a plurality of said sheets; means coupled with said moving means and responsive to the position of the leading edge of each of said end portions for stopping the movement of said sheet material with the trailing extremity of the end portion adjacent to said cutter assembly; means adjacent to said cutter assembly for shifting each end portion in a direction to align the trailing extremity thereof with said cutter assembly; a vertically shiftable table adjacent to said aligning means for receiving and stacking said sheets, said table having a mechnism for sensing the height of the stack thereon; and means coupled with said mechanism for raising and lowering said table, whereby the distance through which the table moves will progressively decrease as the height of the stack increases.

10. A sheet handling method comprising the steps of: providing a supply of sheet material; moving the sheet material along a predetermined path past a cutting zone; sensing the position of the leading edge of said sheet material after said leading edge has moved through a predetermined distance past said cutting zone; stopping the movement of said sheet material as a function of the sensing of said leading edge; holding the sheet material in a fixed position after it has been stopped; cutting the sheet material at said zone to form a stretch having a length equal to said predetermined distance; and placing said stretch in a stack below said cutting zone and said fixed position.

11. A sheet handling method comprising the steps of: providing a supply of sheet material; moving the sheet material along a predetermined path past a cutting zone; cutting successive end portions of the sheet material to define a plurality of sheets having a predetermined length; sensing the position of the leading edge of each end portion after said leading edge has moved through a distance past said cutting zone equal to said predetermined length; stopping the movement of said sheet material as a function of the sensing of the leading edge of each end portion, whereby each end portion can be cut to form the respective sheet; holding each end portion in a fixed position while it is being cut; and stacking said sheets at a location below said cutting zone and said fixed position after the sheets have been formed.

12. A sheet handling method as set forth in claim 11, wherein said stacking step includes raising the stack of sheets to each sheet held in said fixed position, releasing the last-mentioned sheet, and lowering said stack with the last-mentioned sheet thereon.

13. A sheet handling method as set forth in claim 11, wherein said step of moving the sheet material includes shifting the same along a first portion of said path at a relatively high speed until the trailing extremity of a corresponding end portion is adjacent to said cutting zone and thereafter shifting the sheet material along said path at a reduced speed until said trailing extremity is at said cutting zone, said sensing step including sensing the leading edge of the corresponding end portion at a pair of longitudinally spaced sensing stations, the speed of said sheet material being reduced as said leading edge passes the upstream sensing station and the movement of the sheet material being stopped when said leading edge is at the downstream sensing station.

14. A sheet handling method as set forth in claim 11, wherein said stacking step includes raising the sheet stack to a position adjacent to said path to receive a sheet after the latter has been cut and is being releasably held in said path, lowering the sheet stack after the last-mentioned sheet has been released, and progressively lowering the lowermost position of said sheet stack as a function of the height of progressive increase in the height thereof.

References Cited
UNITED STATES PATENTS

| | | | |
|---|---|---|---|
| 2,266,759 | 12/1941 | Huck | 83—364 |
| 2,458,612 | 1/1949 | Luzzatto et al. | 83—210 |
| 2,738,007 | 3/1956 | Power et al. | 83—364X |
| 3,192,809 | 7/1965 | Crouch et al. | 83—152X |
| 3,228,273 | 1/1966 | Huffman | 83—94 |
| 3,267,782 | 8/1966 | Benzing | 83—94 |
| 3,304,822 | 2/1967 | Barnes et al. | 83—364X |

FRANK T. YOST, Primary Examiner

U.S. Cl. X.R.

83—92, 152, 210, 364, 365, 367